June 1, 1937.  T. LINDSTROM  2,082,014
CIRCUIT BREAKER
Filed April 2, 1935   2 Sheets-Sheet 1

INVENTOR
Ture Lindstrom
ATTORNEY

June 1, 1937.  T. LINDSTROM  2,082,014
CIRCUIT BREAKER
Filed April 2, 1935   2 Sheets-Sheet 2
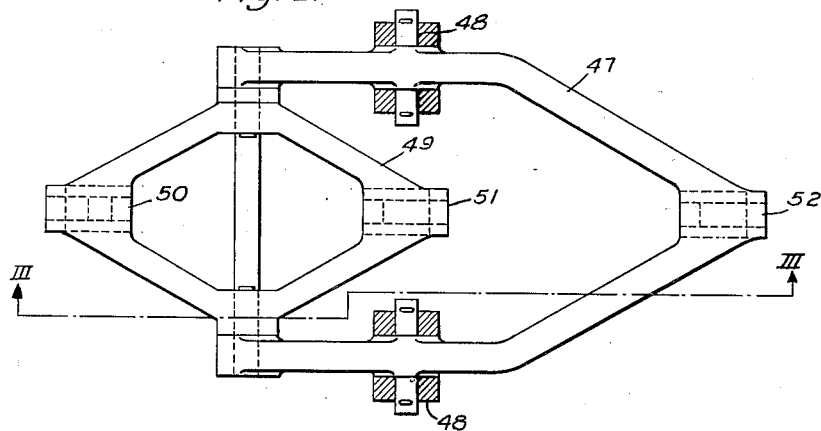
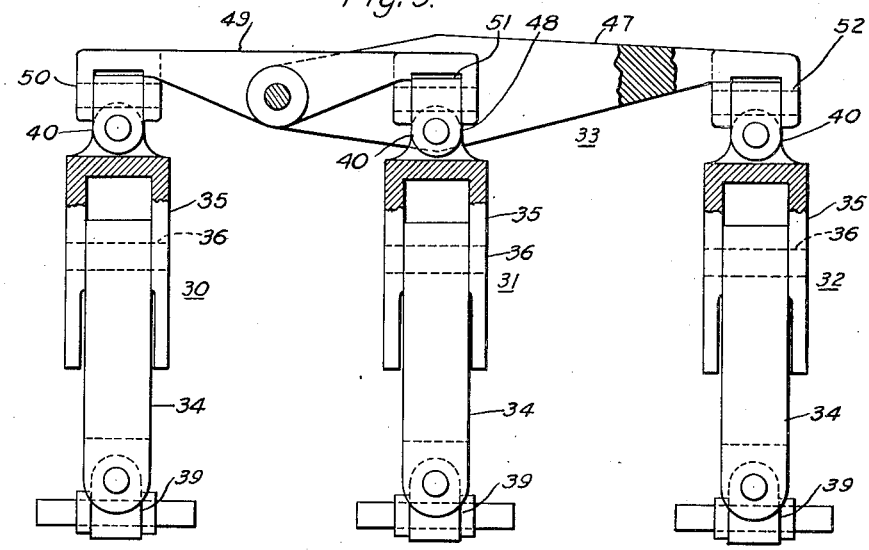
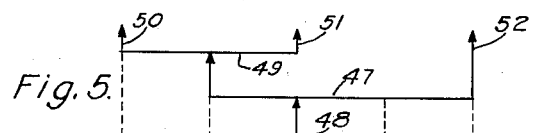
WITNESSES:
INVENTOR
Ture Lindstrom
BY
ATTORNEY Patented June 1, 1937

2,082,014

UNITED STATES PATENT OFFICE 2,082,014

CIRCUIT BREAKER

Ture Lindstrom, Edgewood, Pa., assignor to Westinghouse Electric & Manufacturing Company, East Pittsburgh, Pa., a corporation of Pennsylvania Application April 2, 1935, Serial No. 14,236

14 Claims. (Cl. 200—107)

This invention relates generally to circuit breakers and more particularly to the mechanism for actuating the switch members of a multiple pole breaker.

The object of the invention is to provide for effecting the tripping of all the switches of the different poles of a breaker when any one is tripped.

A further object of the invention is to provide for balancing the pressures between the cooperative switch members of the different poles of a circuit breaker.

It is also an object of the invention to provide for distributing equally or in a predetermined ratio the pressures between the cooperative switch members of the different poles of the circuit breaker.

The invention accordingly is disclosed in the embodiment thereof shown in the accompanying drawings, and comprises the features of construction, combination of elements and arrangement of parts which will be exemplified in the construction hereinafter set forth and the scope of the application of which will be indicated in the claims.

Figure 1:
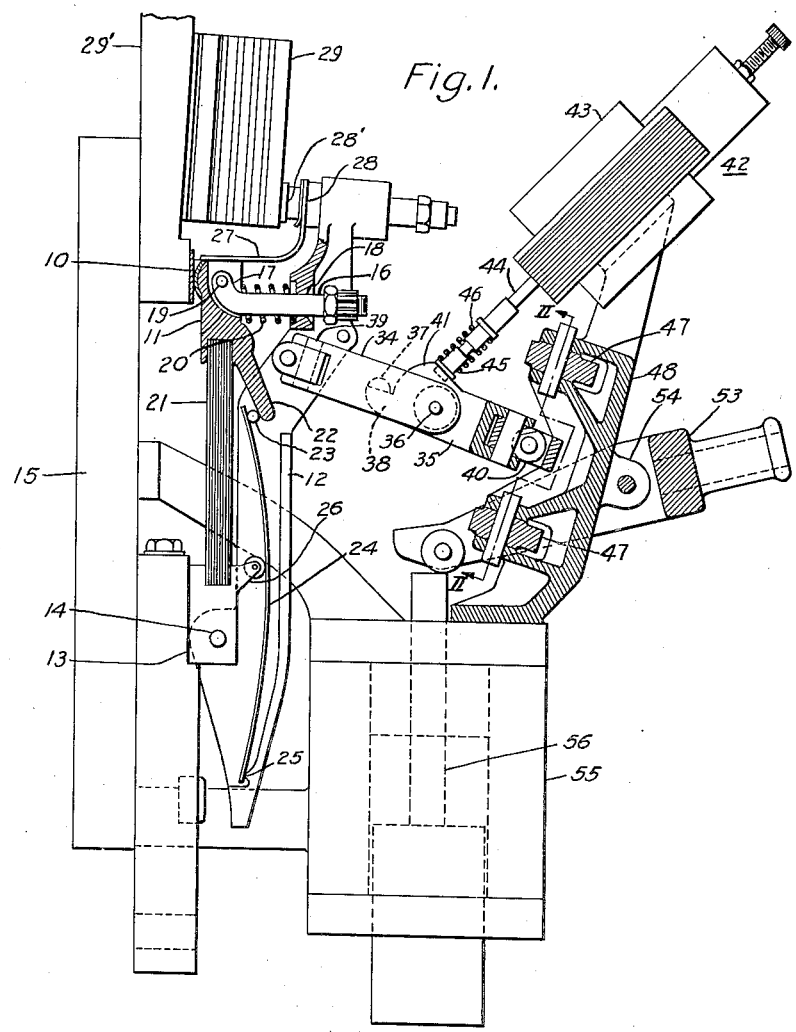
Figure 4:
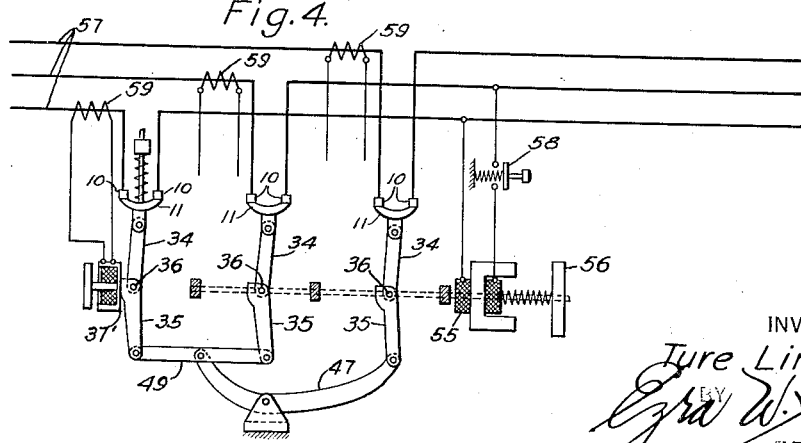

For a fuller understanding of the nature and objects of the invention, reference may be had to the following detailed description taken in conjunction with the accompanying drawings, of which Figure 1 is a view partly in side elevation and partly in section of a circuit breaker constructed in accordance with this invention, Fig. 2 is a view in section taken along the line II—II of Fig. 1, Fig. 3 is a view in section taken along the line III—III of Fig. 2, Fig. 4 is a diagrammatic view showing how a three pole breaker constructed in accordance with this invention may be connected into an electrical circuit system, and Fig. 5 is a diagram illustrating the manner in which the pressures are distributed between the cooperative switch members of the different poles of the breaker.

Referring to the drawings, and Fig. 1 in particular, a pair of cooperative switch members 10 and 11 are shown in engagement. The switch member 11 is carried by an actuating arm 12 pivoted on a bracket 13 at the point 14. The bracket 13 may be mounted on the switchboard 15 or other suitable support.

In mounting the switch member 11, an eye member 16 having an upwardly curved end 17 is slidably mounted in an opening 18 provided in the upper end of the actuating arm 12. As illustrated, the switch member 11 is pivotally mounted on the end 17 of the eye member by means of a pin 19. When the switch member 11 is mounted in this manner it may be oscillated through a predetermined angle about the pin 19. A biasing spring 20 carried by the eye member 16 is disposed between the switch member 11 and the actuating arm.

A laminated conductor 21 extends between the bracket 13 and the switch member 11. Notches are provided in the bracket 13 and switch member 11 to receive the opposite ends of this laminated conductor 21. In this manner provision is made for conducting current to the switch member 11 without conducting it through the pivot point 14 of the actuating arm 12.

In breakers of this type, heavy currents are conducted and it sometimes happens that the cooperative switch members are welded together. In order to break apart the cooperative switch members 10 and 11 during a switching operation a tail piece 22 is provided on the switch member 11 and when the switch members are in engagement it seats against a pin 23 provided on the actuating arm 12.

As shown, a flat spring 24 is provided for biasing the actuating arm 12 clockwise on its pivot point 14 to effect the separation of the cooperative switch members 10 and 11. The spring 24 is disposed between the pins 23 and the seat 25 provided on the switch actuating arm 12 and a projection 26 provided on the bracket 13. With the spring mounted in this manner when the cooperative contact or switch members 10 and 11 are in engagement, the spring is flexed and exerts a biasing force on the switch actuating arm 12. Therefore, when the switch is tripped, the spring biases the arm 12 clockwise about its pivot point and it exerts a leverage action to the tail piece of the switch member 11 which will tend to roll it on and break it loose from the switch member 10 if they happen to be welded.

As shown, the eye member 16 permits the actuating arm to move a predetermined distance relative to the switch member 11. This permits the spring 24 to exert its full force in rolling the switch member 11 on the switch member 10. The conductor 21 is laminated and since the copper plates are flexible they permit the flexing of the conductor 21 a sufficient amount to effect the separation of the switch members.

An arcing member 28 is provided on the switch actuating arm 12 and is connected to the switch member 11 by a flexible shunt 27. The arcing member 28 is disposed to engage the arcing member 28' carried by the arc chute 29. As shown the arc chute 29 is carried by the conductor 29' disposed on the panel 15.

In multiple pole breakers of this type, a plurality of pairs of cooperative switch members such as 10 and 11 are provided and each switch member 11 is mounted in the manner described. In the present embodiment of the invention, three pairs of cooperative switch members 10 and 11 are illustrated and each switch member 11 is provided with an actuating arm 12.

The actuating mechanisms for the pairs of cooperative switch members 10 and 11 or for the switch members of the different poles of the breaker comprises three toggle linkages 30, 31 and 32 connected to a floating support, shown generally at 33. The toggle linkages each comprise two members 34 and 35 pivotally connected to one another by a pin 36. Each link 34 is provided with an over-center stop 37 for receiving the projection 38 provided on the corresponding member 35. Instead of the over-center stops 37 and projections 38 a stop 37', shown in Fig. 4, may be provided on the breaker frame for receiving the linkages 30, 31 and 32.

The free end of the member or link 34 of each linkage is connected to a corresponding switch actuating arm 12 through a universal joint 39 while the corresponding links 35 are connected to the frame or floating support 33 through universal joints 40. The toggle linkages are so constructed that when they are actuated to the position illustrated in Fig. 1, they pass dead center and lock the switch members 10 and 11 in engagement. A raised portion 41 is provided on each link 35 to cooperate with a corresponding tripping member shown generally at 42.

When a structure such as shown generally in Fig. 4 is employed the raised portions 41 are so disposed that they cooperate with the stops 37' to break the toggle linkages when the linkages standing in their switch closing positions are actuated by the tripping of any one of the linkages. A part of the stop 41 cooperates in the tripping operation.

Each tripping member comprises an electromagnet 43 and plunger 44. A sliding head 45 is provided on each plunger and a spring 46 is employed to bias the head outwardly. The tripping members 42 are connected to current transformers 59 which are disposed to respond to the current flowing in their corresponding switch members 10 and 11 in accordance with well known practice.

The frame or floating support 33 referred to hereinbefore comprises a U-shaped member 47 which is pivotally mounted in bearings 48 carried by the switch frame. A frame 49 of diamond shape is pivotally mounted between ends of the arms of the U-shaped member 47. Bearings 50 and 51 are provided in the opposite end of the diamond shaped member 49 and are disposed to be aligned with a corresponding bearing 52 provided in the bottom or curved portion uniting the arms of the U-shaped member.

The toggle linkages 30, 31 and 32 are connected to the bearings 50, 51 and 52, respectively, through the universal joints 40, the bearings 50, 51 and 52 serving as members of the universal joints 40.

A forked member 53 is pivotally mounted on the switch frame at 54 for actuating the toggle linkages 30, 31 and 32. As shown an actuating arm is provided for each linkage. In addition to the forked member, an electro-magnet 55 and plunger 56 disposed in alignment with one of the actuating arms of the forked member 53 is provided for actuating the toggle linkages to their switch closing positions. This electromagnet may be controlled in any suitable manner as by connecting it across the power lines 57 and providing a push button switch 58 for closing an actuating circuit for the electromagnet 55 when it is desired to close the breaker. In this instance the switch members 10 are stationary but this is not essential as they might be mounted in other ways.

In the operation of the breaker when the toggle linkages 30, 31 and 32 are actuated to their switch closing positions, the cooperative switch members 10 and 11 are projected into engagement under pressure. The pressure on each switch member 11 is exerted through the spring 20. The resulting reactive pressures are received by the floating support 33 which functions to balance or distribute them.

The functioning of the floating support 33 may best be understood by reference to the diagram in Fig. 5. The reactive pressures exerted on the bearings 50 and 51 are transmitted to the bearings 48 at only half the distance from the axial line of these bearings at which a reactive pressure is delivered to the bearing 52. Therefore, when all the toggle linkages are in their switch closing positions, there is a balanced condition.

Assuming now that an excessive current flows in one pole of the breaker then the electromagnet of the corresponding tripping device 42 will function. When the tripping mechanism functions, it projects the plunger 44 outwardly and breaks the corresponding toggle linkage. As soon as the pressure between one pair of cooperative switch members is released, the point of support or the bearing carried by the floating support for that particular linkage will swing downwardly and the other two under the biasing influence of the springs 20 will move upwardly as viewed in Fig. 5. As illustrated in Fig. 1, the point of support for the broken linkage will move to the left while the points of support for the two unbroken linkages will move to the right, all rotating around the axial line of the bearings 48. As the unbroken linkages move to the right, they will engage the heads 45 of their corresponding tripping devices. When the raised portions 41 of the unbroken toggle linkages pass under their corresponding tripping devices, they too will be broken. Thus, it will be seen that when any one toggle linkage is broken, the other two will also be broken and the breaker will be completely opened in an instant.

As soon as the toggle linkages are broken, the springs 24 cooperating with the strong springs 20 and the arcing-contact spring A will rotate the actuating arms 12 clockwise about their pivot points as viewed in Fig. 1 and through the pins 23 a leverage action will be applied to the switch members 11 tending to roll them on the stationary switch members 10. If the cooperative switch members happen to be welded, this will break them apart.

Since certain changes may be made in the above construction and different embodiments of the invention could be made without departing from the scope thereof, it is intended that all matter contained in the above description or shown in the accompanying drawings shall be interpreted as illustrated and not in a limiting sense.

I claim as my invention:

1. In a multiple pole circuit breaker, in combination, a plurality of cooperating switch members, and means for supporting the switch members for each pole in pressure engagement, said supporting means including a pivoted member through which the pressure is applied and about the pivot of which the pressures applied to the different poles are balanced.

2. In a multiple pole circuit breaker, in combination, a plurality of cooperating switch members, means for supporting the switch members for each pole in pressure engagement, said supporting means including a pivoted member through which the pressure is applied and about the pivot of which the pressures applied to the different poles are balanced, and means for tripping the switch members for one pole, the tripping of the switch members of one pole unbalancing a distribution of pressures and effecting the operation of the other switch members to open the breaker.

3. In a multiple pole circuit breaker, in combination, a plurality of cooperating switch members, means for supporting the switch members for each pole in pressure engagement, said supporting means including a pivoted member through which the pressure is applied and about the pivot of which the pressures applied to the different poles are balanced, and means disposed to trip the switch members to cooperate in performing switching operations, the tripping of the switch members of one pole unbalancing the distribution of pressures between the switch members of the other poles, thereby effecting the opening of the breaker.

4. In a multiple pole circuit breaker, in combination, a plurality of cooperating switch members, means for actuating corresponding switch members into pressure engagement and for maintaining them in engagement under pressure, means cooperative with the actuating means including a pivoted member through which the pressure to the switch members of the different poles is equally applied, means for tripping the switch members, the means for actuating the switch members and the means for tripping the switch members being cooperative when the switch members of one pole are tripped to effect the tripping of the other switch members.

5. In a multiple pole circuit breaker, in combination, a plurality of cooperating switch members, means for actuating corresponding switch members into pressure engagement, means including a pivoted member through which the reactive pressures upon the actuating means of the different poles act for balancing the reactive pressures of the different poles, means for tripping the switch members of the different poles, the means for balancing the pressures cooperating with the means for tripping the switch members to effect the separation of the corresponding switch members when the switch members for one pole are tripped.

6. In a multiple pole circuit breaker, a plurality of cooperating switch members, actuating members for moving corresponding switch members into engagement under pressure, and means including a pivoted member for supporting said actuating members, said supporting means being disposed to apply the pressure through said pivoted member about the pivot of which the pressures applied to the different poles are balanced.

7. In a multiple pole circuit breaker, a plurality of cooperating switch members, actuating members for moving corresponding switch members into engagement under pressure, means including a pivoted member for supporting said actuating members, said supporting means being disposed to apply the pressure through said pivoted member about the pivot of which the pressures applied to the different poles are balanced, and means for tripping at least one of said actuating members to open said breaker.

8. In a multiple pole circuit breaker, in combination, a plurality of cooperative switch members, means for actuating corresponding switch members into engagement, a floating support for the actuating members disposed to distribute and balance the pressures between corresponding pairs of switch members, means for tripping the switch members for one pole, the tripping of any pair of switch members unbalancing the pressure applied to the other switch members causing a movement of the floating support, whereby the actuating members of the switch members not tripped are moved relative to the tripping members, thereby effecting the tripping of all the switch members and the opening of the breaker.

9. In a multiple pole circuit breaker, in combination, a plurality of cooperative switch members, hinged actuating members for moving corresponding switching members into engagement under pressure, a floating support for the hinged actuating members, the floating support distributing the pressures between cooperative switch members, means disposed to cooperate with each actuating member to separate corresponding switch members, the floating support for the actuating members being disposed to effect a cooperation between the actuating members and the tripping members when one pair of the switches have been tripped, thereby to effect the opening of the breaker.

10. In a multiple pole circuit breaker, a plurality of cooperating switch members, actuating members for moving corresponding switching members into engagement under pressure, means for supporting said actuating members disposed to equalize the pressure between the engaging switch members of the respective poles, and current responsive means for tripping each of said actuating members to open said breaker.

11. In a multiple pole circuit breaker, a plurality of cooperating switch members, actuating members for moving corresponding switching members into engagement under pressure, means for supporting said actuating members disposed to equalize the pressure between the engaging switch members of the respective poles, current responsive means for tripping each of said actuating members, the tripping of one of said actuating members unbalancing the reactive pressures upon the remaining actuating members, and means responsive to said unbalanced condition for tripping the remaining actuating members to thereby open the breaker.

12. A multiple pole circuit breaker comprising a plurality of fixed contacts, a corresponding number of movable contacts, an over-center toggle for moving each of said movable contacts into engagement with its corresponding fixed contact, a floating support for said toggles arranged to equalize the pressure between the corresponding fixed and movable contacts of the respective poles, current responsive means for tripping each of said toggles, said support being movable in response to the unequalization of pressure between the fixed and movable contacts of the respective poles resulting from the tripping of one of said toggles, and means responsive to the movement of said support for tripping the remaining toggles to thereby open the breaker.

13. In a multiple pole breaker, a plurality of cooperating switch members, actuating members for moving corresponding switching members into engagement under pressure, a movable support for said actuating members, means for tripping each of said actuating members, said support being movable in response to the tripping of one of said actuating members, and means responsive to the movement of said support for tripping the remaining actuating members to open the breaker.

14. In a multiple pole breaker, a plurality of cooperating switch members, an over-center toggle for moving corresponding switching members into engagement under pressure, a movable support for said toggles, current responsive means for tripping each of said toggles, said support being movable in response to the tripping of one of said toggles, and means responsive to the movement of said support for tripping the remaining toggles to open the breaker.

TURE LINDSTROM.